Figure 1:
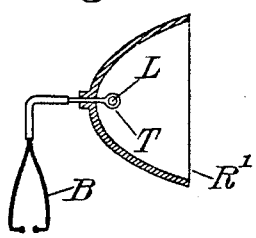

No. 654,630. Patented July 31, 1900.
H. V. HAYES & E. R. CRAM.
RADIOPHONY.
(Application filed June 7, 1897.)
(No Model.)

Attest,
William W. Swan
Chas R Cwfa.

Inventors
Hammond V. Hayes
Ernest R. Cram

UNITED STATES PATENT OFFICE.

HAMMOND V. HAYES AND ERNEST R. CRAM, OF CAMBRIDGE, MASSACHUSETTS, ASSIGNORS TO THE AMERICAN BELL TELEPHONE COMPANY, OF BOSTON, MASSACHUSETTS.

RADIOPHONY.

SPECIFICATION forming part of Letters Patent No. 654,630, dated July 31, 1900.

Application filed June 7, 1897. Serial No. 639,635. (No model.)

*To all whom it may concern:*

Be it known that we, HAMMOND V. HAYES and ERNEST R. CRAM, of Cambridge, Massachusetts, have invented a new and useful Improvement in Radiophony, whereby sounds and signals of any description impressed upon and causing interruptions or variations in the strength of an electric current in a local circuit are transmitted from a station where they are so impressed to a distant station and there repeated or given out by radiophony without the use of intervening wires, of which the following is a specification.

The radiophones employed in carrying out our invention do not differ substantially from radiophones already in use or already fully described in printed publications. Certain substances, as is well known, will so vary in electrical resistance when subjected to rapid changes in radiant energy that when so subjected, if placed in an electric circuit containing a telegraph or telephone receiver, such receiver will give out signals or sounds corresponding to variations or interruptions in the source of radiant energy. So, again, as is also well known, certain substances will give out sounds directly if subjected to rapid changes in radiant energy. Radiophones whose mode of operation is based on either of these phenomena are employed in carrying out our invention. We show both forms in the drawings hereto annexed; but for convenience hereinafter the radiophones of either kind at the distant station by which sounds are given out are termed "radiophone-receivers," and for want of a better designation the apparatus at the transmitting-station in and by which sounds or signals are sent, consisting of the device for generating an electric current, the device for converting the said electric current into radiant energy, and means for varying the strength of the electric current whereby the amount of radiant energy undergoes similar variations, is termed a "radiophone-transmitter" or "radiophone transmitting apparatus."

The invention consists in interrupting or varying an electrical current in a local circuit according to a code of signals or by articulation converting the energy of the said electric current thus interrupted or varied into radiant energy, thereby producing similar interruptions or variations in said radiant energy and causing rays of said radiant energy thus interrupted or varied to fall upon a distant substance so sensitive to rapid changes in radiant energy as to give out sounds under such variations or a substance whose electrical resistance varies under rapid changes in radiant energy.

In carrying out this invention we provide at the transmitting-station an electrical working circuit containing the source of electric current and a device for developing radiant energy, together with means for producing the desired or characteristic alterations of said radiant energy, the said means comprising an auxiliary circuit associated either conductively or inductively with said working circuit and a transmitting apparatus in said auxiliary circuit adapted to alter the current thereof and thereby correspondingly modify the current supplied by said working circuit to said device for developing radiant energy.

The invention also consists in details of construction and circuit arrangement.

The modifications in the strength of the electric current resulting from modifications produced by the operation of the transmitting instrument in the auxiliary circuit, whereby corresponding modifications or alterations in the amount of radiant energy are obtained, may be effected in various ways—such as, for instance, by shunting a portion of the electric current from the source of the radiant energy, by superimposing a variable current upon the direct current at the source of the radiant energy, or by varying the intensity of the direct current at the source of the electric current. The variations in the electrical current of the transmitting-circuit may be effected by any suitable transmitting or circuit-changing device—such as, for example, a microphone-transmitter or a Morse key.

In the drawings, Figure 1 is a radiophone-receiver such as is employed to emit sounds directly under the rapid variations or interruptions of radiant energy falling upon it.

Figure 2:
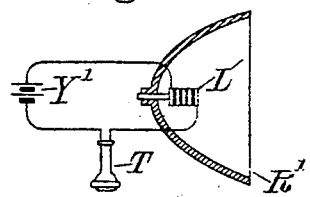
Figure 3:
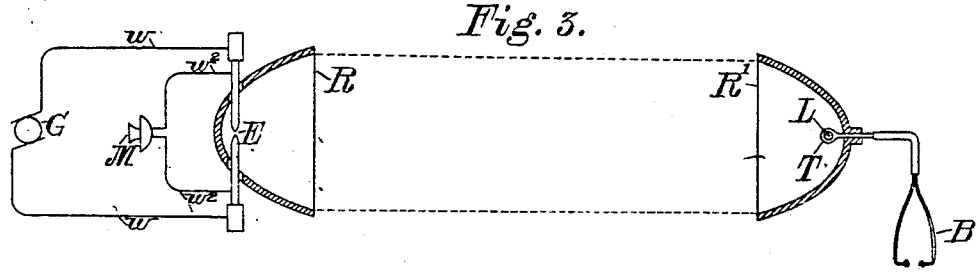
Figure 4:
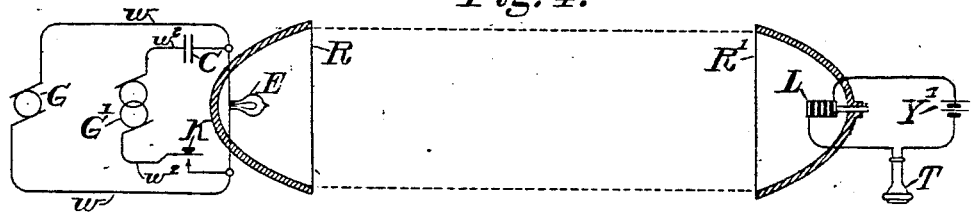
Figure 5:
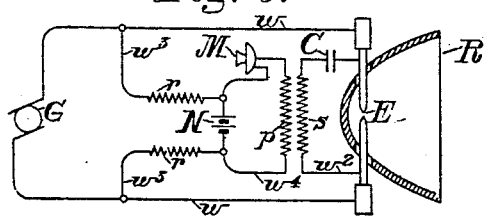
Figure 6:
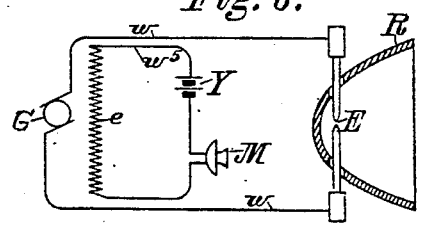

Fig. 2 is a radiophone-receiver provided with an electric circuit containing a telephone to be operated indirectly by the rapid variations of the radiant energy falling upon the radiophone. Fig. 3 is a diagram representing a radiophone-transmitter designed to operate a radiophone receiver of the kind shown with it and also shown at Fig 1, or it may be used with a radiophone-receiver of the kind shown at Fig. 2. Figs. 4, 5, and 6 are diagrams representing each a separate modification of radiophone transmitting apparatus, or, more especially, modifications in the form of the auxiliary circuit containing the transmitting apparatus. In Fig. 4 is shown also a radiophone-receiver of the kind shown at Fig. 2.

The same letters are used through all the figures to represent the same or corresponding devices.

Describing first the simplest form of transmitter (shown in Fig. 3,) G is a generator of the electric current. E is the source of radiant energy, in this instance being an arc-light, or, more exactly speaking, the arc of an arc-light in circuit with the generator by wires $w\ w$, as shown. $w^2$ is a shunt-circuit containing a microphone-transmitter M, and R is a parabolic reflector.

In the radiophone-receiver shown at Fig. 1 and also at Fig. 3 in connection with the transmitting-radiophone just described, R' is a parabolic reflector. L is a substance extremely sensitive to heat, (burnt cork or lampblack well answers the purpose,) and T is a glass tube containing the said sensitive substance L, closed at the end within the reflector and open at the other end. For convenience a flexible tube B, provided with earpieces, is employed, as in the phonograph. In the operation the energy of the electric current generated by the generator G is converted into radiant energy in the arc of the arc-light E, and this energy is modified by the microphone-transmitter M when the latter is spoken to in the ordinary manner— that is, by shunting a portion of the electric current from the source of the resonant energy and thereby varying the radiant energy. The parabolic reflector R faithfully reflects in parallel lines rays of energy in all their changing conditions due to the action of the microphone in the shunt-circuit, and these rays in every condition are received by the parabolic reflector R' and focused upon the sensitive substance or lampblack L, which will now emit articulate sounds corresponding to the changes produced in the microphone M by talking to it in the ordinary manner.

In Fig. 4, G is an electric generator. E is the source of radiant energy, being in this instance an incandescent light in circuit with the said generator by wires $w\ w$. G' is an auxiliary generator furnishing an alternating current in a shunt-circuit $w^2$, containing also a Morse key K and a condenser C, and R is a parabolic reflector. When the key K is depressed, the condenser C permits the alternating current of the shunt-circuit to pass through the source of radiant energy, but prevents the direct current of the main circuit from passing into the shunt-circuit. The mode of operation needs no further description. In this instance the desired variations in the radiant energy are effected by superimposing a variable current upon the direct current at the source of the radiant energy. With this radiophone-transmitter either form of radiophone-receiver may be used.

In Fig. 5, G is the generator. E is an arc-light in circuit with the generator by wires $w\ w$. C is a condenser in a shunt-circuit $w^2$, which contains also the secondary $s$ of an induction-coil. $w^3$ is a second shunt or branch circuit from the main circuit provided with two equal resistances $r\ r$ and connected in turn, as shown, with a shunt from itself, (circuit $w^4$.) This last-named shunt-circuit $w^4$ contains the primary $p$ of the induction-coil, already mentioned, a Planté cell N, placed equidistant from the said two resistances $r\ r$, and a microphone-transmitter M. The operation is obvious with either form of radiophone-receiver herein described and shown. In this instance also a variable current is superimposed upon the direct current at the source of radiant energy.

In Fig. 6, G is the generator, E is an electric light, and $w\ w$ the main circuit containing both, as before described; but in this instance upon the field-magnets of the said generator G are wound convolutions of wire $e$, which are included in an auxiliary circuit $w^5$, (in this instance having only inductive association with the main circuit,) in which is in turn included an auxiliary source of current, in this instance a battery Y and a microphone-transmitter M. Here the variations in the auxiliary circuit increase and decrease the strength of the magnetic field of the generator. Thus the desired variations in the radiant energy developed at E are produced by varying the intensity of the direct current.

It will be observed that in Fig. 4 we show an incandescent lamp as a source of radiant energy and also that in the said Fig. 4 we show a make-and-break key for causing signal interruptions or variations in the electric current, while in Figs. 3, 5, and 6, illustrating transmitting apparatus, we show arc-lights and microphones. We should say that for transmitting speech practically or otherwise than theoretically and experimentally we find the more powerful arc-light essential, and when using keys for varying the electric current according to a Morse or other code the arc-light for the radiant-energy device is much more satisfactory than the incandescent light. A direct electric current relatively large in comparison with the variations which are superimposed upon it will in the production of radiant energy, as described above, result in the most perfect reproduction in the radiant energy of the variations of the electric current. So, too, when the variable component of the total current is quite small, even then by the use of a sufficiently-large direct-component current the variable component of the radiant energy produced may be made as large as desired.

We claim—

1. The combination with a radiophone-receiver, of an electrical circuit containing a source of electric current and a device for developing radiant energy under the action of said source, and means for producing characteristic alterations of said radiant energy, consisting of an auxiliary circuit associated with said first-named circuit and a transmitting apparatus contained therein and adapted to alter the current thereof and thereby correspondingly modify the current supplied in said first-named circuit to said device for developing radiant energy, substantially as described.

2. The combination with a radiophone-receiver, of a transmitting apparatus consisting of an electric circuit containing a generator or other source of electric current and a device for developing radiant energy under the action of said generator or other source of electric current, a shunt-circuit about said device for developing radiant energy, and a transmitting apparatus within said shunt-circuit for altering the amount of said radiant energy, substantially as described.

3. The combination with a radiophone-receiver of an electric circuit with a generator of electricity and an arc-light therein, a shunt to said circuit with a circuit-changing device therein, and a reflector adapted to direct rays of radiant energy developed in the said arc-light to the said radiophone-receiver, substantially as described.

HAMMOND V. HAYES.
ERNEST R. CRAM.

Witnesses:
WILLIAM W. SWAN,
CHAS. R. CROSS.